US012570349B2

(12) United States Patent
Zhu et al.

(10) Patent No.: US 12,570,349 B2
(45) Date of Patent: Mar. 10, 2026

(54) WHEEL SET BRAKE MECHANISM AND BABY TRANSPORT

(71) Applicant: WONDERLAND SWITZERLAND AG, Steinhausen (CH)

(72) Inventors: Wanquan Zhu, Dongguan (CN); Zhengwen Guo, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 354 days.

(21) Appl. No.: 18/250,061

(22) PCT Filed: Oct. 22, 2021

(86) PCT No.: PCT/EP2021/079357
§ 371 (c)(1),
(2) Date: Apr. 21, 2023

(87) PCT Pub. No.: WO2022/084515
PCT Pub. Date: Apr. 28, 2022

(65) Prior Publication Data
US 2023/0406390 A1    Dec. 21, 2023

(30) Foreign Application Priority Data

Oct. 22, 2020    (CN) .......................... 202011143964.3

(51) Int. Cl.
B62B 9/08    (2006.01)
(52) U.S. Cl.
CPC .............. B62B 9/082 (2013.01); B62B 9/087 (2013.01); B62B 2301/0463 (2013.01)

(58) Field of Classification Search
CPC .................. B62B 9/08–087; B62B 2301/0463
See application file for complete search history.

(56) References Cited

U.S. PATENT DOCUMENTS

| | | | |
|---|---|---|---|
| 5,460,399 A | 10/1995 | Baechler et al. | |
| 6,341,672 B1 | 1/2002 | Yang et al. | |
| (Continued) | | | |

FOREIGN PATENT DOCUMENTS

| | | |
|---|---|---|
| CN | 2649449 Y | 10/2004 |
| CN | 101905710 A | 12/2010 |
| (Continued) | | |

OTHER PUBLICATIONS

Machine Translation of CN 111391910 A (Year: 2020).*

(Continued)

*Primary Examiner* — David R Morris
(74) *Attorney, Agent, or Firm* — HAUPTMAN HAM, LLP

(57) ABSTRACT

A wheel set brake mechanism includes a drive member mounted on the movable frame; and a brake assembly including a drive pin, a traction member and a locking member. The drive pin is operably connected to the drive member. The traction member includes a first cable and a second cable, a first end of the first cable is connected to the drive pin, a second end of the first cable extends into an inner cavity of the hollow shaft to be rotatably connected to a first end of the second cable, and a second end of the second cable is connected to the locking member. The drive member is configured to drive the drive pin to slide so that the traction member causes the locking member to slide to lock the wheel.

20 Claims, 13 Drawing Sheets

(56) References Cited

U.S. PATENT DOCUMENTS

| | | | |
|---|---|---|---|
| 6,742,791 | B2 | 6/2004 | Lan |
| 8,596,657 | B1 * | 12/2013 | Liu .......................... A61H 3/04 |
| | | | 280/79.11 |
| 2007/0170015 | A1 | 7/2007 | Chen |
| 2010/0326775 | A1 | 12/2010 | Chen |
| 2018/0043918 | A1 | 2/2018 | Plested et al. |
| 2023/0142068 | A1 | 5/2023 | Xu et al. |

FOREIGN PATENT DOCUMENTS

| | | | |
|---|---|---|---|
| CN | 201721490 | U | 1/2011 |
| CN | 203528569 | U | 4/2014 |
| CN | 204020960 | U | 12/2014 |
| CN | 204309872 | U | 5/2015 |
| CN | 205675095 | U | 11/2016 |
| CN | 206297599 | U | 7/2017 |
| CN | 207450001 | U | 6/2018 |
| CN | 108820029 | A | 11/2018 |
| CN | 109305211 | A | 2/2019 |
| CN | 109466613 | A | 3/2019 |
| CN | 111391910 | A | 7/2020 |
| CN | 111799940 | A | 10/2020 |
| JP | 2015202808 | A | 11/2015 |
| JP | 3218610 | U | 10/2018 |
| JP | 6651095 | B1 | 2/2020 |
| TW | 201505885 | A | 2/2015 |
| TW | 201507905 | A | 3/2015 |
| TW | 201509705 | A | 3/2015 |
| TW | I594910 | B | 8/2017 |
| TW | I611963 | B | 1/2018 |
| WO | 2009062347 | A1 | 5/2009 |
| WO | 2014198312 | A1 | 12/2014 |
| WO | 2016098506 | A1 | 6/2016 |

OTHER PUBLICATIONS

Machine Translation of CN 109466613 A (Year: 2019).*

Notice of Allowance issued in Japanese Application No. 2023-524666 dated Aug. 6, 2024; 7 pgs.

International Search Report issued in corresponding International Application No. PCT/EP2021/079357, dated Dec. 20, 2021, pp. 1-3, European Patent Office, Rijswijk, Netherlands.

Written Opinion issued in corresponding International Application No. PCT/EP2021/079357, dated Dec. 20, 2021, pp. 1-7, European Patent Office, Rijswijk, Netherlands.

Taiwan First Office Action issued in corresponding Taiwan Application No. 110139366, dated May 18, 2022, pp. 1-12.

Taiwan First Office Action issued in corresponding Taiwan Application No. 112100955, dated Mar. 8, 2023, pp. 1-9.

Japanese Office Action issued in corresponding Japanese Application No. 2023-524666, dated Apr. 18, 2024, pp. 1-24.

Taiwanese Office Action issued in corresponding Taiwanese Application No. 113105045, dated Mar. 26, 2024, pp. 1-11.

First Office Action in Corresponding Taiwan Application No. 113143620, dated Apr. 9, 2025; 6 pgs.

First Office Action issued in Chinese Application No. 202011143964.3; mailed Jul. 11, 2025, 21 pages.

Examination Report in Corresponding Australian Application No. 2024266721, dated Oct. 3, 2025; 7 pgs.

* cited by examiner

100

100

100

—49a

—49c

—49

WHEEL SET BRAKE MECHANISM AND BABY TRANSPORT

CROSS-REFERENCE TO RELATED APPLICATION

This application is a U.S. National Phase of International Application Number PCT/EP2021/079357, filed Oct. 22, 2021, which claims priority to Chinese Patent Application No. CN2020111439643, entitled "WHEEL SET BRAKE MECHANISM AND BABY TRANSPORT" and filed on Oct. 22, 2020, the entire contents of which are incorporated herein by reference.

TECHNICAL FIELD

The present application relates to wheel brake technologies, and in particular, to a wheel set brake mechanism and a baby transport including the mechanism.

BACKGROUND

A baby transport generally has a brake mechanism. When a user depresses a drive member of the brake mechanism with a foot, the brake mechanism may lock a rear wheel of the baby transport, so as to prevent accidental movement of the baby transport and improve safety of use of the baby transport. In some baby transports, brake mechanisms for individual rear wheels are disconnected from each other. In the case of braking, the user is required to operate the drive member of each brake mechanism separately, so that the brake mechanisms lock the corresponding rear wheels respectively. Such baby transports have a more complicated brake operation. In some other baby transports, brake mechanisms for individual rear wheels share a same drive member. The user operates the same drive member to enable the brake mechanisms to lock the rear wheels at the same time. Such baby transports simplify the brake operation, but have a more complex structure.

In addition, a front wheel of the baby transport is generally a universal wheel, and the rear wheel may also be a universal wheel to enable the baby transport to run smoothly when making a turn. However, the rear wheel is easy to rotate when the baby transport runs forward normally, which makes it difficult for the baby transport to move forward normally.

SUMMARY

An objective of the present application is to provide a wheel set brake mechanism with a simple structure and a baby transport including same.

In one aspect, the present application provides a wheel set brake mechanism for locking a wheel of a movable frame, the wheel being mounted on the movable frame through a hollow shaft in such a way the wheel is rotatable in all directions, the wheel set brake mechanism including: a drive member mounted on the movable frame; and a brake assembly including a drive pin, a traction member and a locking member, wherein the drive pin is operably connected to the drive member, the traction member includes a first cable and a second cable, a first end of the first cable is connected to the drive pin, a second end of the first cable extends into an inner cavity of the hollow shaft to be rotatably connected to a first end of the second cable, and a second end of the second cable is connected to the locking member. The drive member is configured to drive the drive pin to slide so that the traction member causes the locking member to slide to lock the wheel.

In another aspect, the present application provides a baby transport, including a movable frame and the wheel set brake mechanism described above, wherein the movable frame includes a front wheel and a rear wheel, the rear wheel is mounted on the movable frame through a hollow shaft in such a way the rear wheel is rotatable in all directions and the wheel set brake mechanism is configured to lock the rear wheel.

DETAILED DESCRIPTION OF THE EMBODIMENTS

Figure 1:
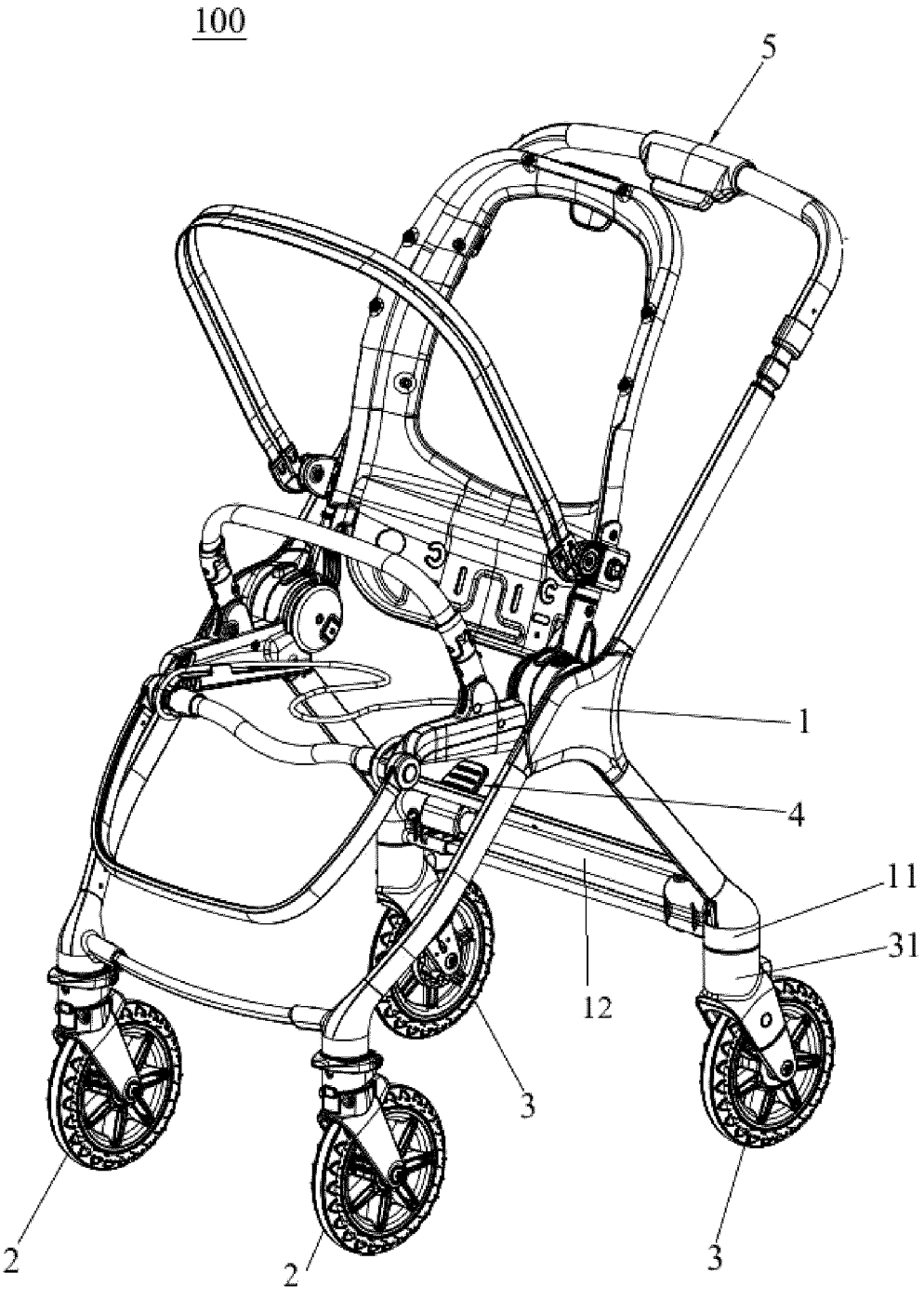
FIG. 1 is a front perspective view of a baby transport according to an embodiment of the present application.

In order to describe the technical contents, structural features and achieved effects of the present application in detail, a detailed description is provided below with reference to implementations and the accompanying drawings.

An aspect of the present application provides a wheel set brake mechanism for locking a wheel of a movable frame, the wheel being mounted on the movable frame through a hollow shaft in such a way the wheel is rotatable in all directions, the wheel set brake mechanism including: a drive member mounted on the movable frame; and a brake assembly including a drive pin, a traction member and a locking member, wherein the drive pin is operably connected to the drive member, the traction member includes a first cable and a second cable, a first end of the first cable is connected to the drive pin, a second end of the first cable extends into an inner cavity of the hollow shaft to be rotatably connected to a first end of the second cable, and a second end of the second cable is connected to the locking member. The drive member is configured to drive the drive pin to slide so that the traction member causes the locking member to slide to lock the wheel.

In an embodiment, the drive member includes a sleeve portion and a pedal portion extending from the sleeve portion, a horizontal tube of the movable frame being sleeved with the sleeve portion, one of the horizontal tube and the sleeve portion being provided with an elongated hole, the other of the horizontal tube and the sleeve portion being provided with a chute, and the drive member having an initial position and a braking position circumferentially spaced at a predetermined angle. The drive pin is sleeved with the horizontal tube, the drive pin is provided with a radially-protruding sliding shaft passing through an elongated hole and a chute. The drive member drives the sliding shaft to slide in the elongated hole and the chute when switching between the initial position and the braking position, so that the drive pin moves along an axis direction of the horizontal tube to allow the locking member to unlock or lock the wheel.

In an embodiment, the wheel set brake mechanism further includes a first elastic member configured to act on the drive pin, so as to keep the drive member at the initial position through the drive pin.

In an embodiment, the brake assembly further includes a first elastic reset member configured to act on the locking member, so as to keep the locking member at an unlocking position where the wheel is unlocked.

In an embodiment, the sleeve portion is symmetrically provided with two chutes, and the horizontal tube is provided with two elongated holes corresponding to the two chutes respectively; the wheel set brake mechanism is provided with two brake assemblies, and the locking members of the two brake assemblies are configured to lock two wheels of the movable frame, wherein the sliding shaft of each of the two brake assemblies is sleeved with a corresponding set of the chute and the elongated hole; and the first elastic member is clamped between the drive pins of the two brake assemblies.

In an embodiment, the second end of the first cable has a connector, the connector being provided with a connecting groove; and the first end of the second cable is provided with a first pivot joint, the first pivot joint being rotatably arranged in the connecting groove.

In an embodiment, the movable frame is provided with a wheel seat, and the wheel has a wheel stand, the wheel stand being pivotally connected to the wheel seat through the hollow shaft arranged vertically; the locking member includes a transverse shaft and a longitudinal shaft arranged perpendicularly to each other, a sliding sleeve is fixed to the longitudinal shaft, the sliding sleeve slidably engages with the wheel stand, an axis of the sliding sleeve is perpendicular to a rolling axis of the wheel, and an end portion of the sliding sleeve away from the transverse shaft is provided with an accommodating groove; and the second end of the second cable is provided with a second pivot joint, the second pivot joint being rotatably arranged in the accommodating groove.

In an embodiment, a first elastic reset member is arranged between the wheel stand and the sliding sleeve.

In an embodiment, the longitudinal shaft extends into the sliding sleeve and is connected to the sliding sleeve through a pin shaft.

In an embodiment, a hub of the wheel is provided with a plurality of engagement holes along a circumferential direction, and the transverse shaft is capable of entering the engagement hole to lock the wheel or exiting the engagement hole to unlock the wheel.

In an embodiment, the movable frame is provided with a wheel seat, and the wheel has a wheel stand, the wheel stand being pivotally connected to the wheel seat through the hollow shaft arranged vertically; the locking member includes a transverse shaft and a longitudinal shaft arranged perpendicularly to each other, the longitudinal shaft slidably engages with the wheel stand, and an axis of the longitudinal shaft is perpendicular to a rolling axis of the wheel; the second end of the second cable is connected to the longitudinal shaft; and a hub of the wheel is provided with a plurality of engagement holes along a circumferential direction, and the transverse shaft is capable of entering the engagement hole to lock the wheel or exiting the engagement hole to unlock the wheel.

In an embodiment, the drive member includes a sleeve portion and a pedal portion extending from the sleeve portion, a horizontal tube of the movable frame being sleeved with the sleeve portion, and the drive member having an initial position and a braking position circumferentially spaced at a predetermined angle; and the wheel set brake mechanism further includes a locking assembly configured to lock the drive member at the braking position.

In an embodiment, the locking assembly includes a locking protrusion arranged outside the horizontal tube; the sleeve portion is provided with an end surface abutting against the locking protrusion, the end surface is provided with a locking recess; and when the locking protrusion engages with the locking recess, the drive member is locked at the braking position.

In an embodiment, the locking protrusion is formed by an elastically extensible locking pin, and an axis of the locking pin is parallel to an axis direction of the horizontal tube.

In an embodiment, an end portion of the horizontal tube is provided with a wheel seat, the wheel seat is provided with a mounting hole, a second elastic member and the locking pin are arranged in the mounting hole, and an end portion of the locking pin configured to engage with the locking recess is in a shape of a circular arc or truncated cone.

In an embodiment, the end surface is further provided with a guide groove slidably engaging with the locking protrusion.

Another aspect of the present application provides a baby transport, including a movable frame and the wheel set brake mechanism described above, wherein the movable frame includes a front wheel and a rear wheel, the rear wheel is mounted on the movable frame through a hollow shaft in such a way the rear wheel is rotatable in all directions and the wheel set brake mechanism is configured to lock the rear wheel.

In an embodiment, the movable frame is provided with a wheel seat, and the rear wheel has a wheel stand, the wheel stand is pivotally connected to the wheel seat, so as to allow the rear wheel to rotate in all directions; and the baby transport further includes a wheel set orienting mechanism, the wheel set orienting mechanism being configured to lock rotation of the wheel stand.

In an embodiment, the wheel set orienting mechanism includes an operation portion, a third cable, a locating pin and a second elastic reset member, the operation portion is connected to a first end of the third cable, a second end of the third cable is connected to the locating pin, and an axis of the locating pin is parallel to the rotation axis of the wheel stand; and the wheel stand is provided with a locating hole, the second elastic reset member is configured to drive the locating pin to extend into the locating hole, and the operation portion is configured to move the locating pin out of the locating hole through the third cable.

In an embodiment, the movable frame includes a pair of front wheels and a pair of rear wheels, each of the front and rear wheels is mounted on the movable frame so as to rotate in all directions, and the wheel set orienting mechanism is configured to lock rotation of both wheel stands of the pair of rear wheels.

Figure 2:
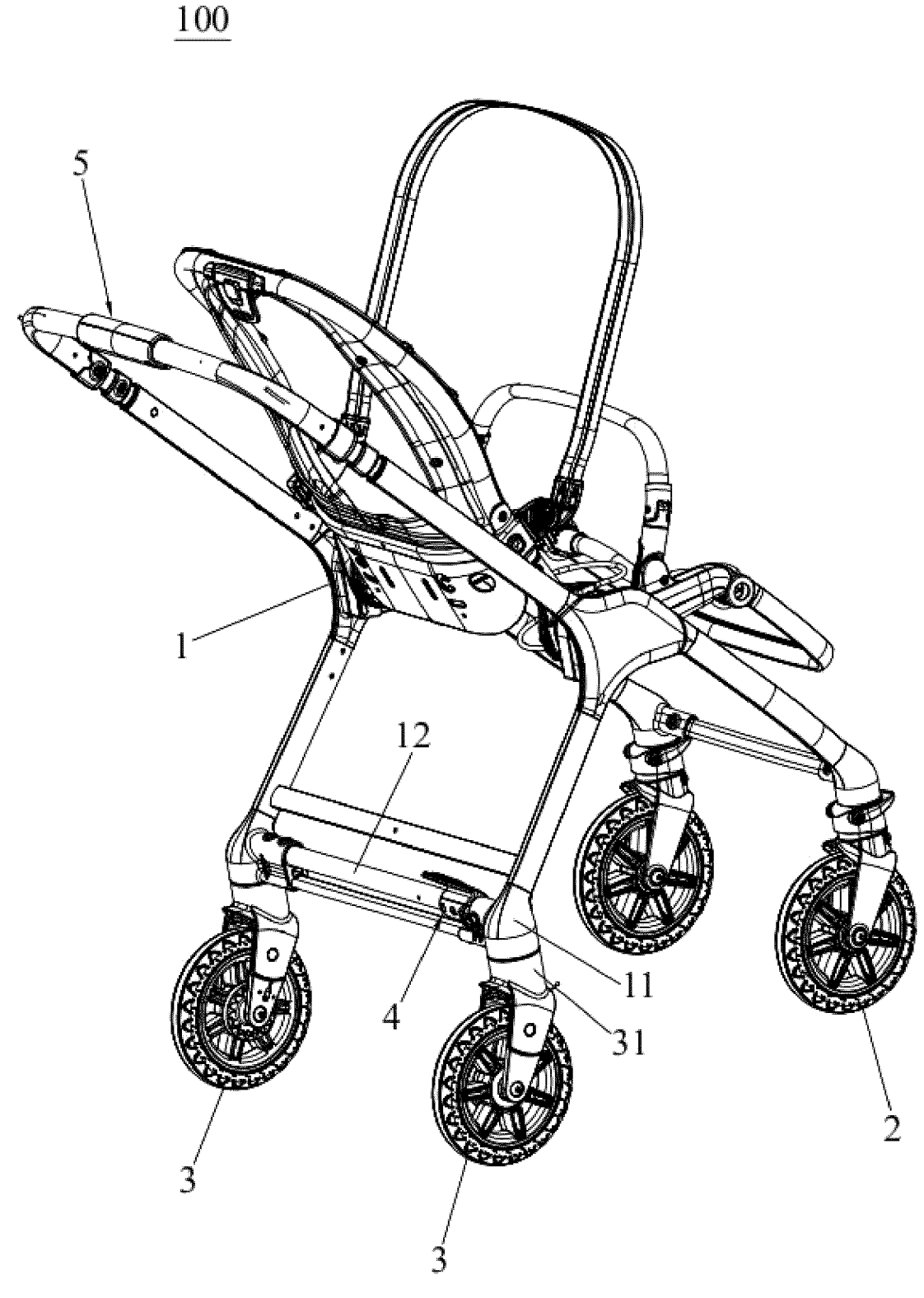
FIG. 2 is a rear perspective view of the baby transport according to an embodiment of the present application.

As shown in FIG. 1 and FIG. 2, for example, a baby transport 100 according to an embodiment of the present application is a baby stroller. The baby transport 100 may include a movable frame 1 and a seat (not marked in the figures) mounted to the movable frame 1, and the baby transport 100 is provided with a wheel set brake mechanism 4 according to an embodiment of the present application. It may be understood that the type of the baby transport 100 is not limited to the baby stroller. In addition, the application scope of the wheel set brake mechanism according to the embodiment of the present application is not limited to the baby transport 100 either.

The movable frame (hereinafter referred to as "frame") 1 may be provided with a pair of front wheels 2 and a pair of rear wheels 3. The front wheel 2 may be a universal swiveling wheel, and the rear wheel 3 may also be, for example, a universal swiveling wheel. Specifically, the rear wheel 3 is provided with, for example, a wheel stand 31, a horizontal tube 12 is arranged under a rear end of the frame 1, and the horizontal tube 12 is provided with wheel seats 11 on two sides respectively. The wheel seats 11 are pivotally connected to the wheel stands 31 of the rear wheels 3 corresponding thereto respectively to allow the wheel stands 31 to drive the rear wheels 3 to make universal rotation. It may be understood that a rotation axis of the wheel stand 31 is perpendicular to an axis of the horizontal tube 12, and a rolling axis of the rear wheel 3 is perpendicular to the rotation axis of the wheel stand 31. It may be understood that when the baby transport 100 runs in a horizontal plane, the rotation axis of the wheel stand 31 is roughly perpendicular to the horizontal plane, and the rolling axis of the rear wheel 3 is roughly parallel to the horizontal plane.

A wheel set brake mechanism 4 is arranged on the frame 1. In this embodiment, the wheel set brake mechanism 4 may lock the two rear wheels 3 at the same time to prohibit rolling of the rear wheels 3, so as to realize braking of the baby transport 100. The wheel set brake mechanism 4 may unlock the two rear wheels 3 at the same time to allow the rear wheels 3 to roll and allow the baby transport 100 to run normally.

A wheel set orienting mechanism 5 is arranged on the frame 1. The wheel set orienting mechanism 5 may restrict rotation of the wheel stands 31 of the two rear wheels 3 at the same time to prohibit universal rotation of the wheel stands 31 around their axis of rotation. The wheel set orienting mechanism 5 may release the restriction on the rotation of the wheel stands 31 of the two rear wheels 3 at the same time to allow the wheel stands 31 to make universal rotation around their axis of rotation.

A structure of the wheel set brake mechanism 4 according to an embodiment of the present application is described below with reference to FIG. 3 to FIG. 12. The wheel set brake mechanism 4 may include a drive member 41, a locking assembly 410 (see FIG. 9), two brake assemblies and a first elastic member 44 (see FIG. 9). The brake assemblies may have a roughly same structure, including, for example, a drive pin 42, a traction member (a first cable and a second cable), a locking member 43 and a first elastic member 44. One of the brake assemblies is mainly described in detail below.

Figure 3:
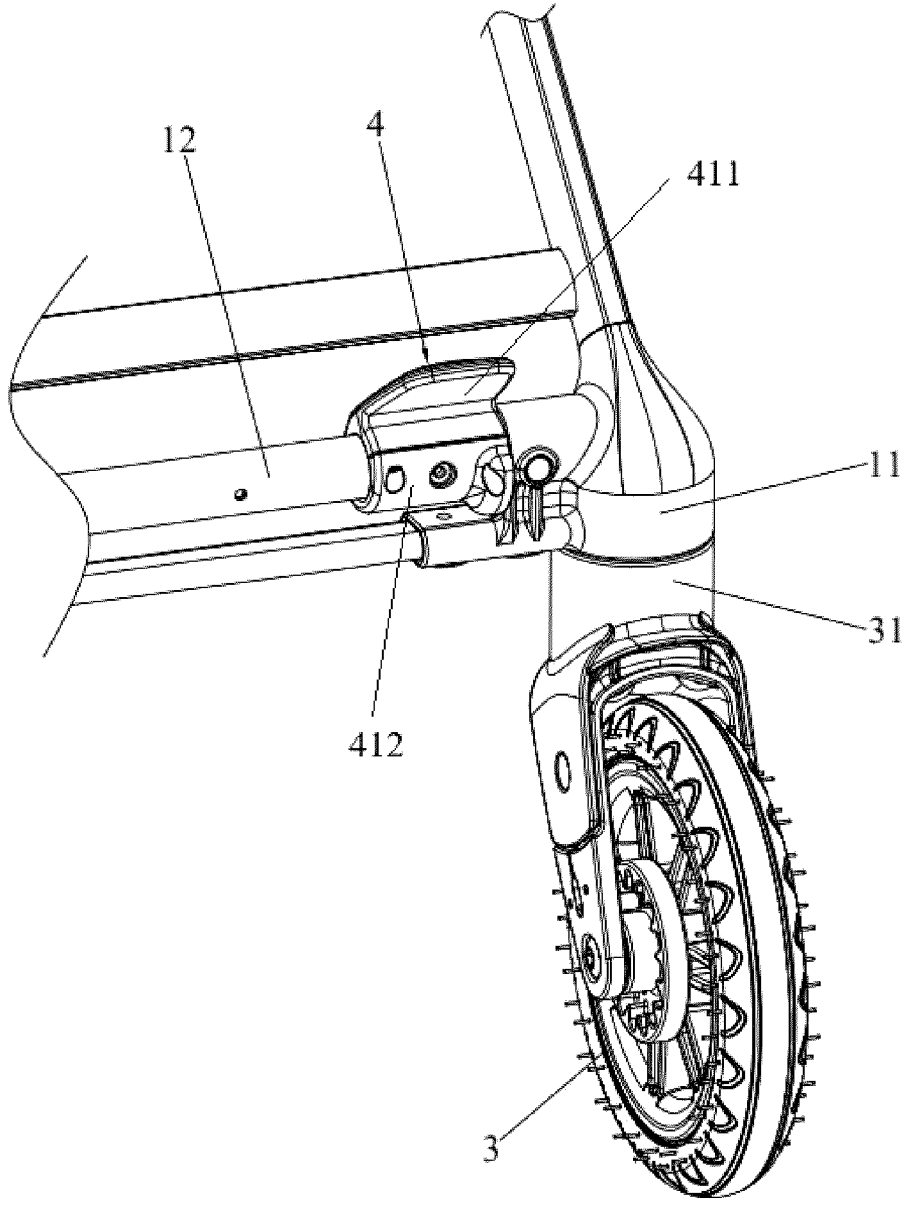
FIG. 3 is a perspective view of a wheel set brake mechanism, a rear wheel and part of a frame in the baby transport according to an embodiment of the present application.
Figure 6:
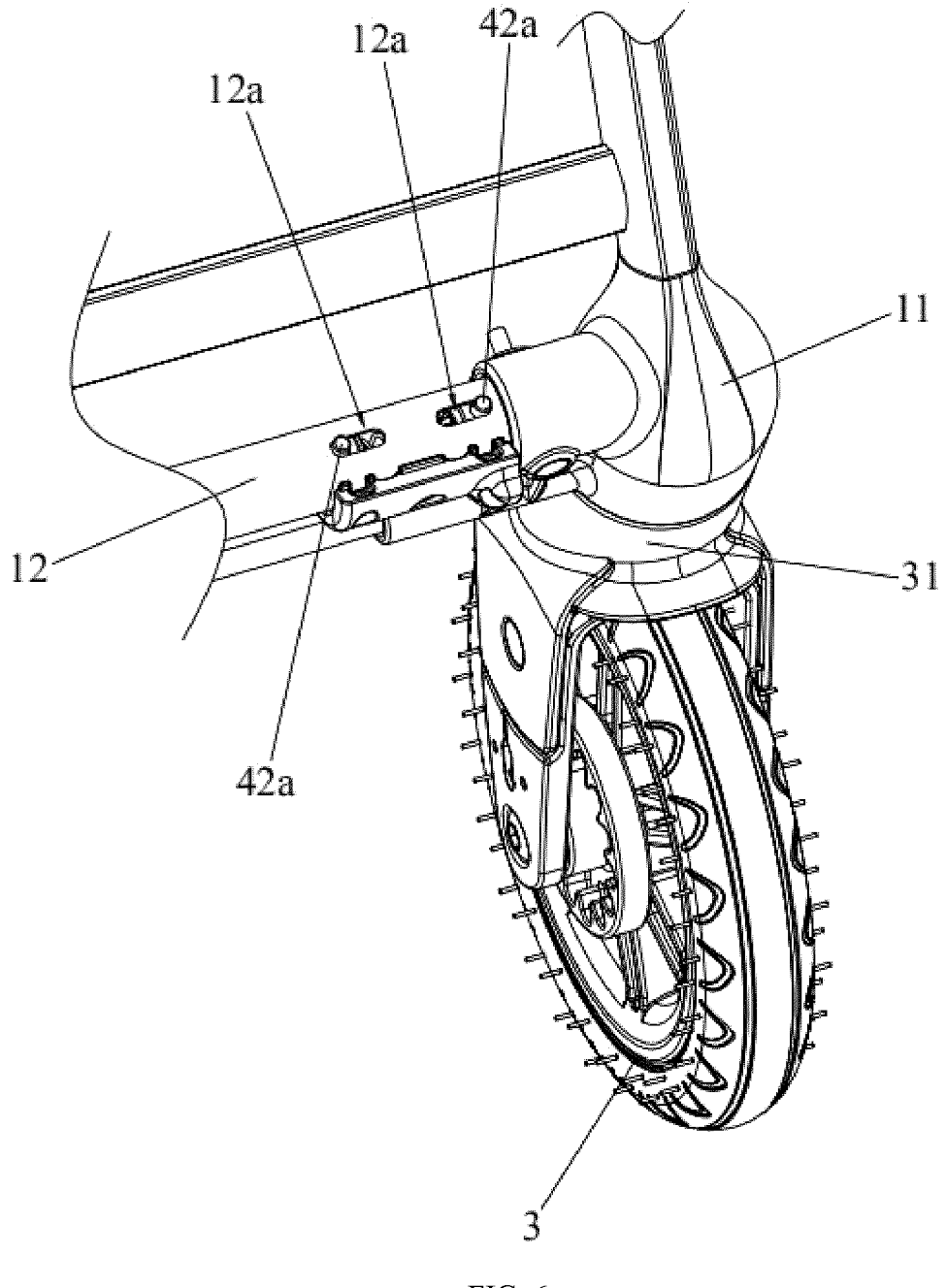
FIG. 6 is a partial perspective view of the rear wheel and the wheel set brake mechanism in the baby transport according to an embodiment of the present application, in which a drive member is omitted for ease of description.
Figure 7:
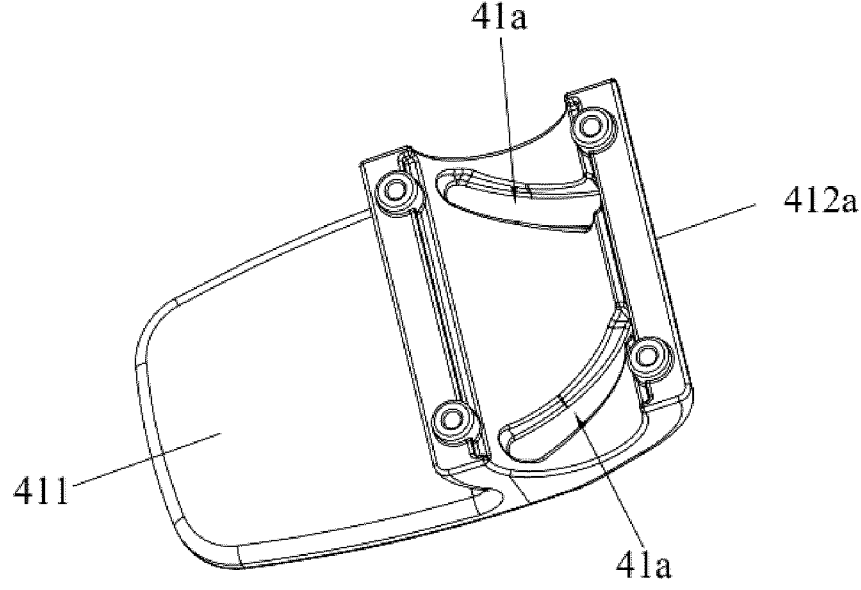
FIG. 7 is a perspective view of a part of the drive member of the wheel set brake mechanism in the baby transport according to an embodiment of the present application.
Figure 8:
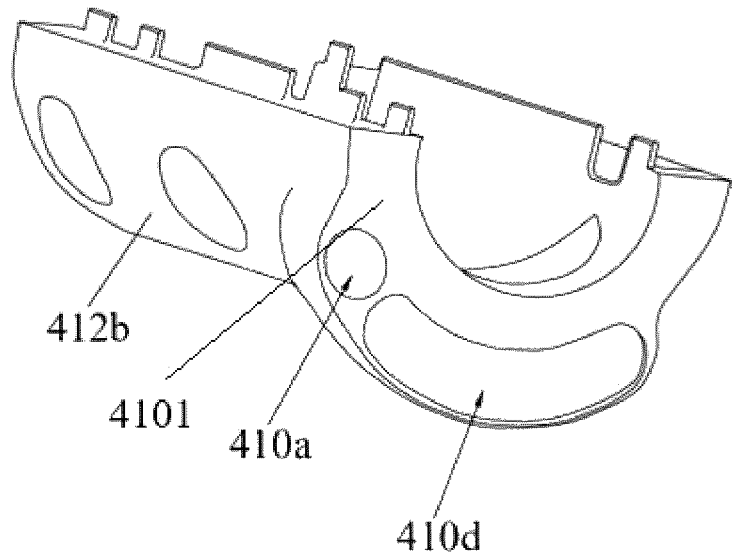
FIG. 8 is a perspective view of another part of the drive member of the wheel set brake mechanism in the baby transport according to an embodiment of the present application.

Referring to FIG. 3, the drive member 41 may include a sleeve portion 412 and a pedal portion 411 extending from the sleeve portion 412. The sleeve portion 412 may be arranged outside the horizontal tube 12 in such a way that the sleeve portion 412 is rotatable around the axis of the horizontal tube 12. Referring to FIG. 7 and FIG. 8, in some embodiments, the sleeve portion 412 may be formed by butting of two semi-cylindrical structures 412a and 412b. Referring to FIG. 7, the sleeve portion 412 may be symmetrically provided with two chutes 41a. Referring to FIG. 6, the horizontal tube 12 may be provided with two elongated holes 12a. One elongated hole 12a corresponds to one chute 41a, and an extension direction of the elongated hole 12a is parallel to an axis direction of the horizontal tube 12. In other embodiments, the two chutes 41a may be arranged on the horizontal tube 12, and the two elongated holes 12a may be arranged on the sleeve portion 412. The pedal portion 411 may extend from the semi-cylindrical structure 412a for a user to depress. In some embodiments, the pedal portion 411, when subjected to depression force from the user, may drive the sleeve portion 412 to pivot downward to enable the drive member 41 to rotate to the braking position. In this case, the rear wheel 3 is locked and cannot rotate. The pedal portion 411, when subjected to upward lifting force from the user, may drive the sleeve portion 412 to pivot upward to enable the drive member 41 to rotate to the initial position. In this case, the rear wheel 3 is unlocked and may rotate freely.

The locking assembly 410 is configured to lock the drive member 41 at the braking position. That is, when the drive member 41 rotates to the braking position, the locking assembly 410 may automatically lock the rotation of the drive member 41, so as to keep the drive member 41 at the braking position. It may be understood that when the user applies the upward lifting force to the pedal portion 411, locking force applied by the locking assembly 410 to the drive member 41 may be overcome, so as to allow the pedal portion 411 to return to the initial position. A structure of the locking assembly 410 will be described in detail below.

Referring to FIG. 6 to FIG. 9, the drive pin 42 is axially movably arranged inside the horizontal tube 12, and an axis of the drive pin 42 is, for example, parallel to the axis of the horizontal tube 12. The drive pin 42 is provided with a radially-protruding sliding shaft 42a. That is, the axis of the sliding shaft 42a is perpendicular to the axis of the horizontal tube 12. The sliding shaft 42a passes through a corresponding set of the elongated hole 12a and the chute 41a. Thus, when the drive member 41 switches between the initial position and the braking position, the drive member 41 may drive the two drive pins 42 of the two brake assemblies to slide at the same time. Specifically, when the drive member 41 rotates, the sliding shafts 42a of the two drive pins 42 are driven by the chutes 41a to be capable of sliding towards or away from each other in the axis direction of the horizontal tube 12 along the elongated holes 12a. The movement of the two sliding shafts 42a may drive the two drive pins 42 to move towards or away from each other.

Figure 9:
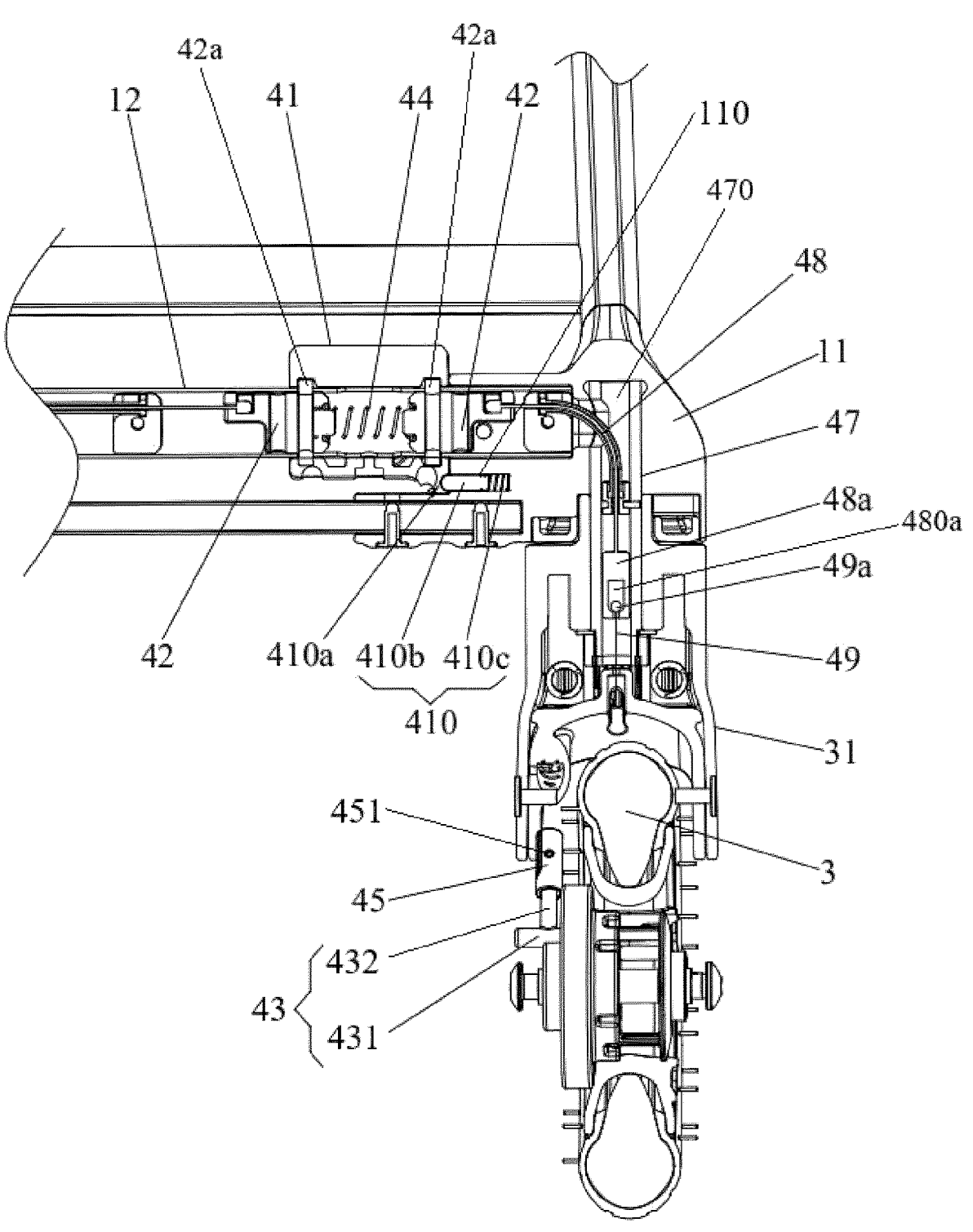
FIG. 9 is a partial front sectional view of the rear wheel and the wheel set brake mechanism in the baby transport according to an embodiment of the present application, in which a structure of a second cable is illustrated.

Referring to FIG. 9, the drive pin 42 of each brake assembly is connected to the locking member 43 through the traction member, so that the drive pin 42 and the locking member 43 can operate synchronously. The traction member may be a flexible cable, such as a wire rope. For example, in some embodiments, the traction member may be a single cable. The traction member has one end connected to the drive pin 42 and another end connected to the locking member 43.

Still referring to FIG. 9, in this embodiment, the traction member may include a first cable 48 and a second cable 49 sequentially connected. More specifically, the wheel seat 11 is provided with a hollow shaft 47 extending down from the wheel seat 11, the hollow shaft 47 is arranged roughly vertically (an axis of the hollow shaft 47 is roughly perpendicular to the axis of the horizontal tube 12), and the wheel stand 31 of the rear wheel 3 is pivotally connected to the wheel seat 11 through the hollow shaft 47. A first end of the first cable 48 is connected to the drive pin 42, a second end of the first cable 48 extends into an inner cavity 470 of the hollow shaft 47 to be rotatably connected to a first end of the second cable 49, and a second end of the second cable 49 is connected to the locking member 43.

In FIG. 9, the second end of the first cable 48 may be provided with a connector 48a, the connector 48a slidably engages with, for example, the hollow shaft 47, and the connector 48a may also be provided with a connecting groove 480a. The second cable 49 has a first pivot joint 49a. The first pivot joint 49a is rotatably arranged in the connecting groove 480a. For example, the first pivot joint 49a may contact a groove wall of the connecting groove 480a through a spherical surface to be stuck in the connecting groove 480a, so that the first cable 48 and the second cable 49 may make relative rotation at a junction of the two while maintaining tension. In FIG. 9, the first pivot joint 49a may be a spherical head, and a traction line of the second cable 49 is led out through a through hole of the connector 48a. The first pivot joint 49a may rotate freely in the connecting groove 480a. Therefore, when the second cable 49 rotates with the rear wheel 3, the first cable 48 and the second cable 49 may not be twisted or wound, so as to prevent the influence on the action of the drive pin 42 and the drive member 41.

Figure 13:
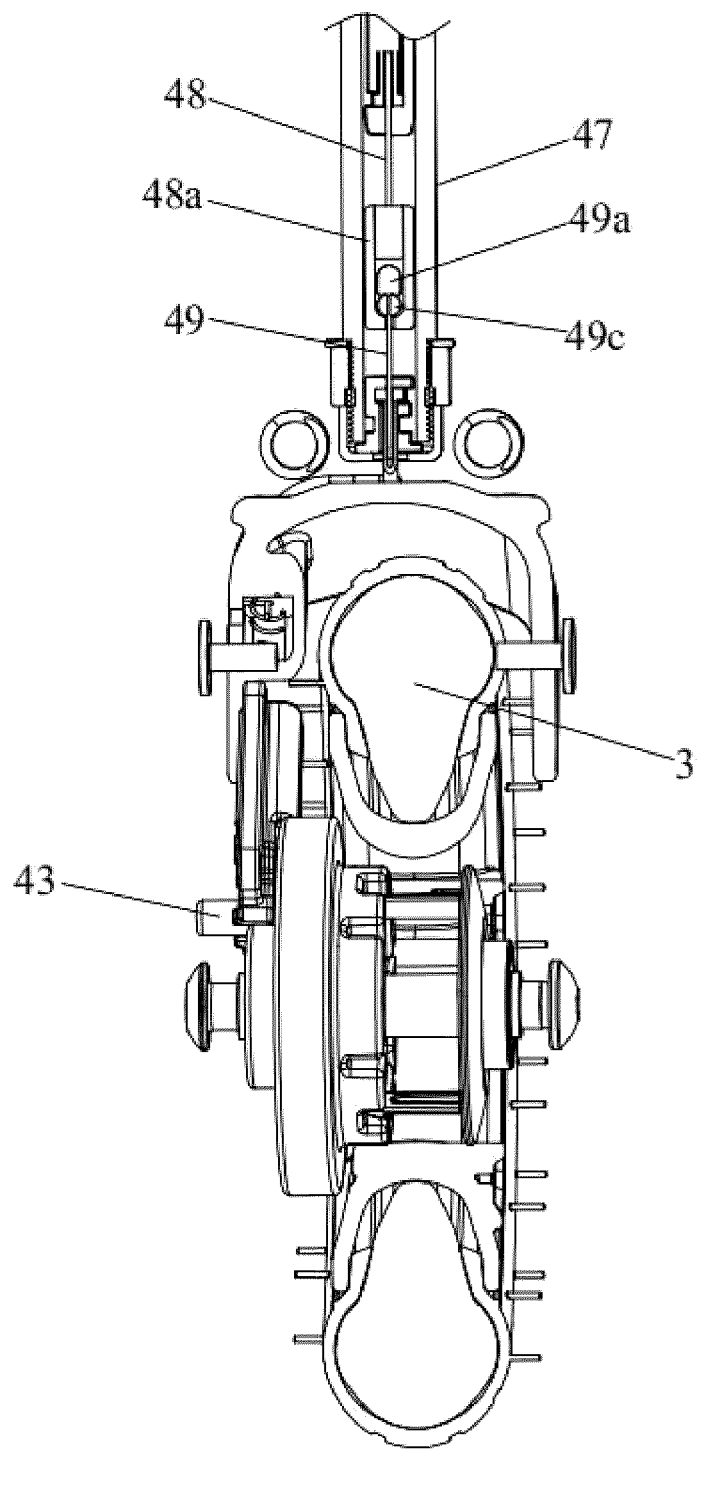
FIG. 13 is a partial front sectional view of the rear wheel and the wheel set brake mechanism in the baby transport according to an embodiment of the present application, in which another structure of the second cable is illustrated.
Figure 14:
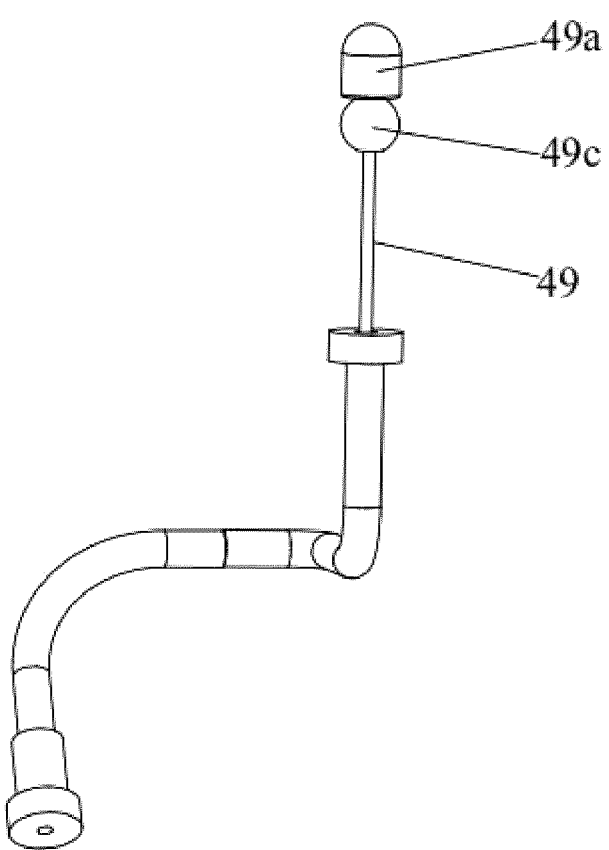
FIG. 14 is a perspective view of the second cable in FIG. 13.

Referring to FIG. 13 and FIG. 14, in some other embodiments, the first pivot joint 49a of the second cable 49 may be of, for example, a cylindrical, conical or bullet-shaped structure. A ball 49c may be arranged on a lower end of the first pivot joint 49a. The traction line of the second cable 49, after passing through the ball 49c, is led out through the through hole of the connector 48a. The ball 49c abuts against the groove wall of the connecting groove 480a, so that the first pivot joint 49a may rotate freely relative to the connecting head 48a with low friction resistance and small noise.

Referring to FIG. 9 to FIG. 12, the locking member 43 is configured to lock the rear wheel 3. It may be understood from the above that the drive member 41 may drive the drive pin 42 to move along the axis of the horizontal tube 12 when rotating to the braking position, and the drive pin 42 may drive the locking member 43 through the traction member to overcome elastic force of the first elastic reset member 46 to make locking movement, so that the locking member 43 moves to a locking position where the rear wheel 3 is locked. When the drive member 41 rotates to the initial position, the locking member 43 may return to, under the action of the first elastic reset member 46, an unlocking position where the rear wheel 3 is unlocked.

Figure 10:
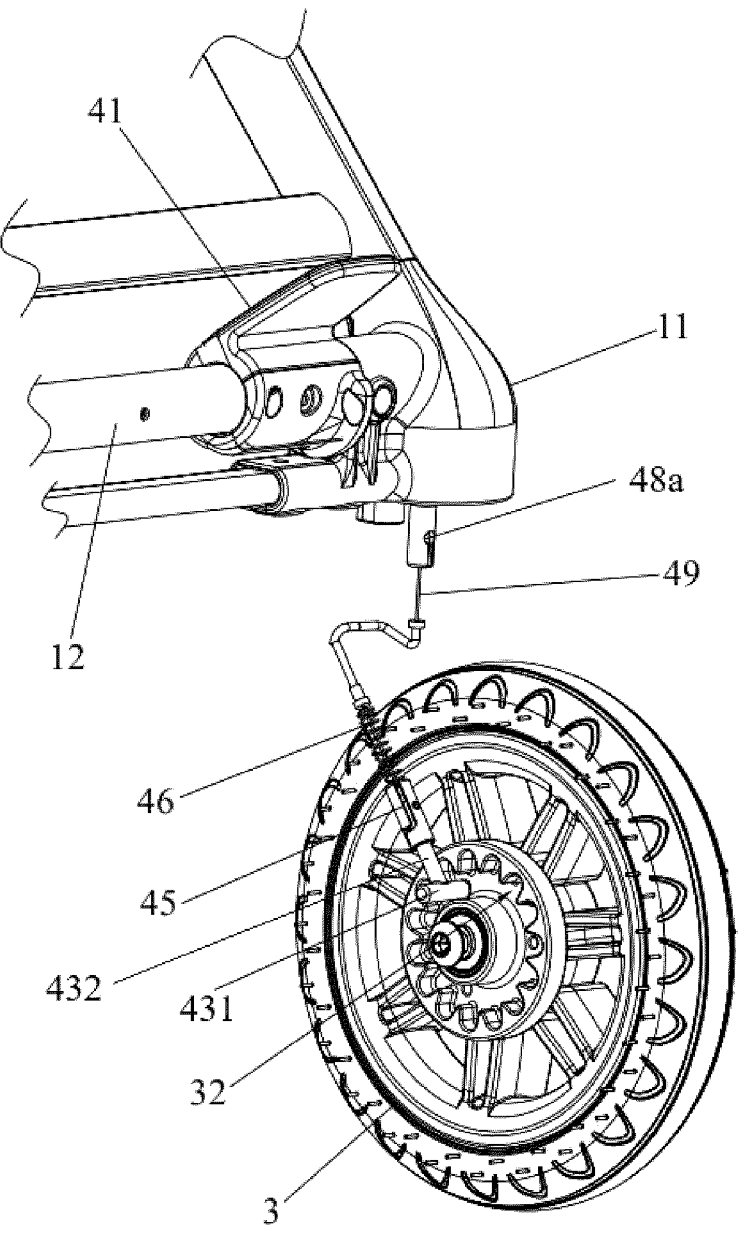
FIG. 10 is a partial perspective view of the rear wheel and the wheel set brake mechanism in the baby transport according to an embodiment of the present application, in which a wheel stand is omitted for ease of description.
Figure 11:
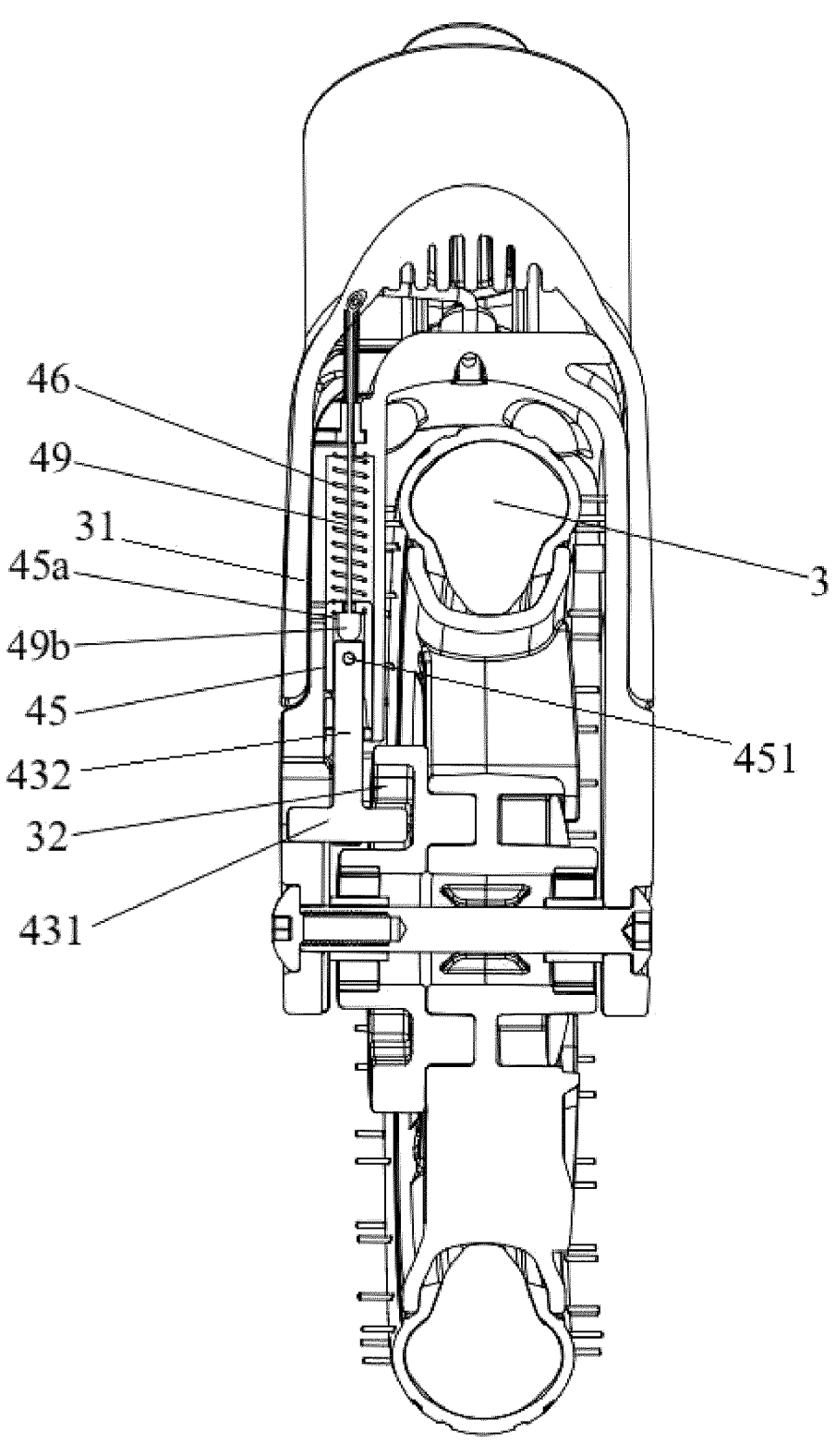
FIG. 11 is a partial sectional view of a locking member of the wheel set brake mechanism in the baby transport according to an embodiment of the present application when the drive member is at an initial position.
Figure 12:
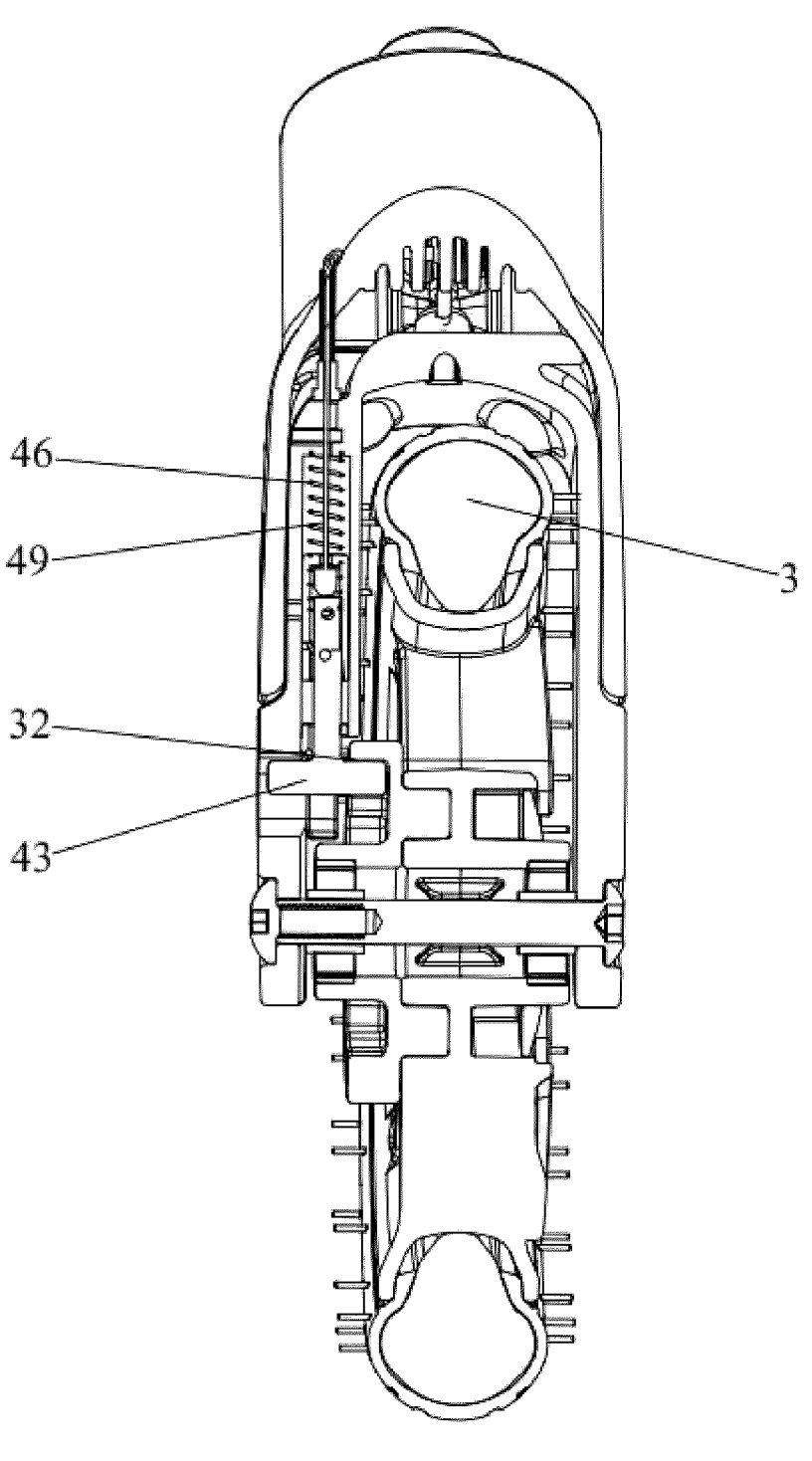
FIG. 12 is a partial sectional view of the locking member of the wheel set brake mechanism in the baby transport according to an embodiment of the present application when the drive member is at a braking position.

Referring to FIG. 10 and FIG. 11, in some embodiments, the locking member 43 may be of a T-shaped structure. More specifically, the locking member 43 may include a transverse shaft 431 and a longitudinal shaft 432 arranged perpendicularly to each other. As can be seen from FIG. 10, a hub of the rear wheel 3 may be provided with a plurality of engagement holes 32 along a circumferential direction, and the transverse shaft 431 may move along a radial direction of the rear wheel 3 to enter the engagement holes 32 or exit the engagement hole 32, so as to lock the rear wheel 3 or unlock the rear wheel 3. In some embodiments, the longitudinal shaft 432 may directly slidably engage with the wheel stand 31, and an axis of the longitudinal shaft 432 is perpendicular to the rolling axis of the rear wheel 3. The second end of the second cable 49 is directly connected to the longitudinal shaft 432. The first elastic reset member 46 may be arranged between the wheel stand 31 and the longitudinal shaft 432. In this way, the second cable 49 directly pulls the longitudinal shaft 432 to enable the transverse shaft 431 to enter the engagement hole 32. On the contrary, the first elastic reset member 46 may push the longitudinal shaft 432 to enable the transverse shaft 431 to exit the engagement hole 32.

Still referring to FIG. 10 and FIG. 11, in this embodiment, a sliding sleeve 45 may be fixed to the longitudinal shaft 432. For example, the longitudinal shaft 432 may extend into the sliding sleeve 45 and is connected to the sliding sleeve 45 through a pin shaft 451. The sliding sleeve 45 slidably engages with the wheel stand 31 of the rear wheel 3, and an axis of the sliding sleeve 45 may be perpendicular to the rolling axis of the rear wheel 3. The first elastic reset member 46 may be arranged between the wheel stand 31 and the sliding sleeve 45. In addition, an end portion of the sliding sleeve 45 away from the transverse shaft 431 may be provided with an accommodating groove 45a, the second end of the second cable 49 is provided with a second pivot joint 49b, and the second pivot joint 49b is rotatably arranged in the accommodating groove 45a. In some embodiments, the second pivot joint 49b may be a spherical head which is accommodated between an end cap of the sliding sleeve 45 and the longitudinal shaft 432. More specifically, the second pivot joint 49b may abut against the end cap of the sliding sleeve 45 to connect the sliding sleeve 45 to the second cable 49. In this way, the second cable 49 drives the sliding sleeve 45 to enable the transverse shaft 431 of the locking member 43 to be stuck in the engagement hole 32. In this way, the first elastic reset member 46 drives the sliding sleeve 45 to enable the transverse shaft 431 of the locking member 43 to exit the engagement hole 32. The arrangement of the sliding sleeve 45 and the second pivot joint 49b may prevent relative torsion between the locking member 43 and the second cable 49. In some embodiments, a ball may also be clamped between the second pivot joint 49b of the second cable 49 and the end cap of the sliding sleeve 45. Arrangement of the ball may be obtained with reference to the ball 49c in FIG. 13.

Referring to FIG. 9, the first elastic member 44 is located in the horizontal tube 12 and located between the two drive pins 42 of the two brake assemblies. The first elastic member 44 is compressed when the drive member 41 switches from the initial position to the braking position. The first elastic member 44 applies force to the two drive pins 42 at the same time when the drive member 41 switches from the braking position to the initial position, which facilitates reset movement of the two drive pins 42 in opposite directions, and the drive member 41 is kept at the initial position through engagement of the sliding shaft 42a of each drive pin 42 with the corresponding chute 41a and the corresponding elongated hole 42a. The first elastic reset member 46 drives the locking member 43 to the unlocking position, so as to facilitate next braking of the rear wheel 3.

Referring to FIG. 8 and FIG. 9, an implementation of the locking assembly 410 is illustrated. The locking assembly 410 may lock the drive member 41 at the braking position or unlock the drive member 41 from the braking position. The locking assembly 410 may include a locking protrusion 410b arranged outside the horizontal tube 12. The sleeve portion 412 of the drive member 41 may be provided with, for example, an end surface 4101 abutting against the locking protrusion 410b. The end surface 4101 is provided with a locking recess 410a. The locking protrusion 410b abuts against the end surface 4101 to be elastically deformed when the pedal portion 411 is depressed to move the drive member 41 from the initial position to the braking position. The locking recess 410a engages with the locking protrusion 410b after the drive member 41 reaches the braking position, so as to lock the drive member 41 to the braking position. In this way, the drive member 41 can be kept at the braking position without requiring the user to keep the force on the drive member, thereby improving the convenience of the braking operation. The pedal portion 411 is lifted to rotate the drive member 41 when the drive member 41 is required to switch from the braking position to the initial position, so that the locking recess 410a is disengaged from the locking protrusion 410b.

In this embodiment, the locking protrusion 410b may be formed by an elastically extensible locking pin, and an axis of the locking pin is parallel to the axis direction of the horizontal tube 12. More specifically, for example, the wheel seat 11 may be provided with a mounting hole 110, and a second elastic member 410c and the locking pin may be arranged in the mounting hole 110. The second elastic member 410c is configured to drive the locking pin to extend out of the mounting hole 110. An end portion of the locking pin configured to engage with the locking recess 410a may be in a shape of a circular arc or truncated cone.

Referring to FIG. 8, the end surface 4101 may be further provided with a guide groove 410d slidably engaging with the locking protrusion 410b, and the locking recess 410a is located at an end of the guide groove 410d. The locking protrusion 410b may slide along the guide groove 410d to guide the rotation of the drive member 41 when the drive member 41 rotates.

Figure 4:
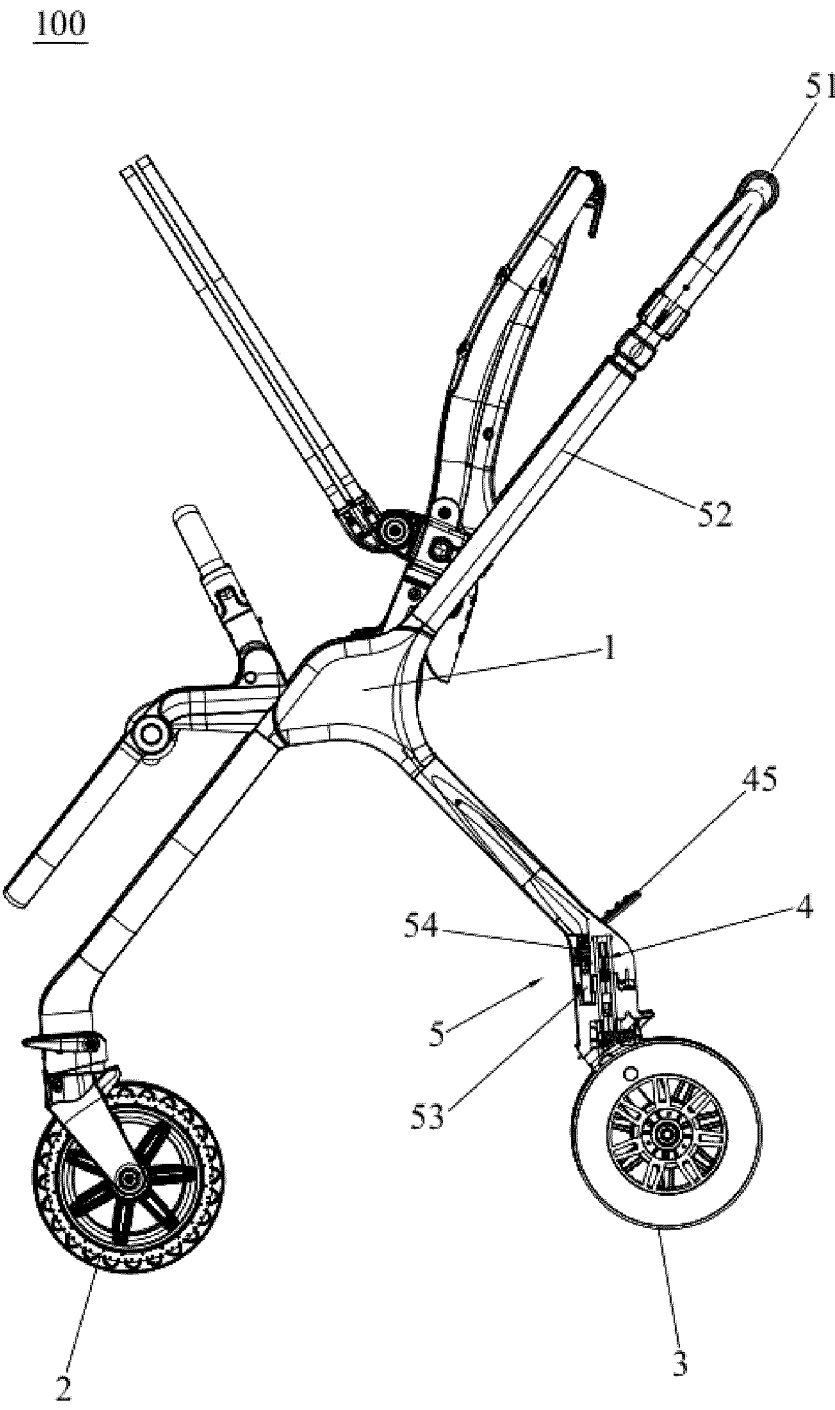
FIG. 4 is a side view of the baby transport according to an embodiment of the present application.
Figure 5:
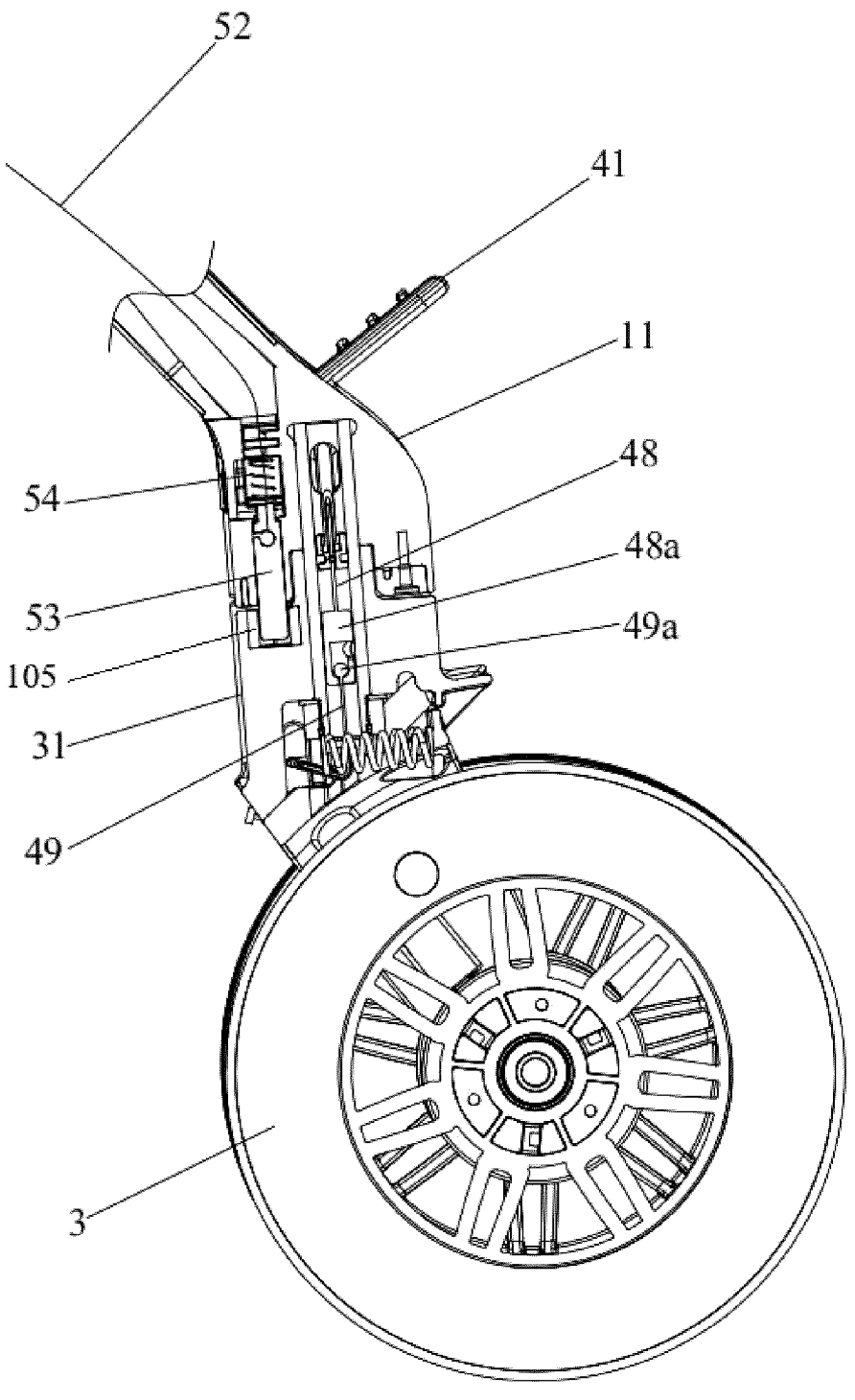
FIG. 5 is a partial side sectional view of a rear wheel, the wheel set brake mechanism and a wheel set orienting mechanism in the baby transport according to an embodiment of the present application.

In the following, referring to FIG. 4 and FIG. 5, the wheel set orienting mechanism 5 includes an operation portion 51, a third cable 52, a locating pin 53 and a second elastic reset member 54. The third cable 52 may be a wire rope. The operation portion 5 may be arranged on an armrest of the baby transport 100 and connected to a first end of the third cable 52. An axis of the locating pin 53 is parallel to the rotation axis of the wheel stand 31, and the locating pin 53 is slidably arranged on the wheel seat 11 of the frame 1. A second end of the third cable 52 is connected to the locating pin 53. The wheel stand 31 is provided with a locating hole 105, and the second elastic reset member 54 provides force that enables the locating pin 53 to extend into the locating hole 105. The locating pin 53 is inserted into the locating hole 105 to locate the wheel 3, so that the rotation of the wheel stand 31 is locked. The operation portion 51 is operated, and the third cable 52 can pull the locating pin 53 out of the locating hole 105, thereby allowing the wheel stand 31 to rotate.

An operation process of the baby transport 100 according to the embodiment of the present application is described below.

The pedal portion 411 is depressed to rotate the drive member 41 on the horizontal tube 12 when the baby transport is required to brake. The two chutes 41a of the drive member 41 drive the sliding shafts 42a of the two brake assemblies to move towards each other. Then, the drive pin 42 of each brake assembly drives the first cable 48, the first cable 48 drives the second cable 49, the second cable 49 drives the locking member 43 to move, and the transverse shaft 431 of the locking member 43 may enter the engagement hole 32 of the rear wheel 3, so as to lock the rolling of the rear wheel 3. The locking protrusion 410b of the locking assembly 410 is stuck in the locking recess 410a of the drive member 41, so that the drive member 41 is kept at the braking position, and the baby transport 100 is kept in a brake state. When the baby transport 100 is required to be unlocked, the pedal portion 411 is lifted to disengage the locking recess 410a of the drive member 41 from the locking protrusion 410b of the locking assembly 410. The drive member 41 may reset under the action of the first elastic member 44, so as to loosen the first cable 48 and the second cable 49. In this case, the locking member 43 moves under the action of the first elastic reset member 46, the transverse shaft 431 exists the engagement hole 32, the wheel 3 is then unlocked, and the baby transport 100 can run.

When the baby transport 100 is required to make a turn, the operation portion 51 may be operated to enable the operation portion 51 to drive the third cable 52 to move, and the third cable 52 drives the locating pin 53 to exit the locating hole 105, so that the wheel stand 31 of the wheel 3 may rotate around the axis of the hollow shaft 47. In this case, the front wheel 2 and the wheel 3 of the baby transport 100 may rotate in all directions, and the baby transport 100 can make a turn freely. When the baby transport is not required to make a turn, the operation portion 51 is released, and the locating pin 53 is re-inserted into the locating hole 105 under the action of the second elastic reset member 54, so as to lock the wheel stand 31 of the rear wheel 3. In this case, the rear wheel 3 of the baby transport 100 can only roll but not rotate in all directions. A specific structure of the operation portion 51 driving the third cable 52 may be a known structure, and is not described in detail herein.

According to the embodiment of the present application, one drive member 41 drives two drive pins 42 to slide, and the two drive pins 42 pull, through two traction members, the two locking members 43 arranged near the two rear wheels 3, so as to implement a function of double brake by one depression. Moreover, the brake structure is relatively simple. Further, the wheel stand 31 of the wheel 3 is pivotally connected to the wheel seat 11 of the frame 1 to enable the baby transport 100 to make a turn freely. In addition, the wheel stand 31 of the wheel 3 is locked or unlocked by means of the wheel set orienting mechanism 5, so as to lock the rotation of the wheel stand 31 or unlock the rotation of the wheel stand 31, which greatly improves the convenience and flexibility of use of the baby transport.

The above disclosed are merely examples of the present application, and certainly cannot be used to limit the scope of the present application. Therefore, equivalent changes made according to the patent scope of the present application still fall within the scope covered by the present application.

The invention claimed is:

1. A wheel set brake mechanism for locking a wheel of a movable frame, the wheel having a wheel stand, the wheel stand being mounted on the movable frame through a hollow shaft in such a way the wheel is rotatable in all directions, the wheel set brake mechanism comprising:

a drive member mounted on the movable frame; and a brake assembly including a drive pin, a traction member and a locking member, wherein the drive pin is operably connected to the drive member, the traction member includes a first cable and a second cable, a first end of the first cable is connected to the drive pin, a second end of the first cable extends into an inner cavity of the hollow shaft to be rotatably connected to a first end of the second cable, and a second end of the second cable is connected to the locking member;

wherein the drive member is configured to drive the drive pin to slide so that the traction member causes the locking member to slide to lock the wheel, and wherein the locking member includes a transverse shaft and a longitudinal shaft arranged perpendicularly to each other, the longitudinal shaft is slidably engaged with the wheel stand, an axis of the longitudinal shaft is perpendicular to a rolling axis of the wheel, the second end of the second cable is connected to the longitudinal shaft.

2. The wheel set brake mechanism according to claim 1, wherein:

the drive member includes a sleeve portion and a pedal portion extending from the sleeve portion, a horizontal tube of the movable frame being sleeved with the sleeve portion, one of the horizontal tube and the sleeve portion being provided with an elongated hole, the other of the horizontal tube and the sleeve portion being provided with a chute, and the drive member having an initial position and a braking position circumferentially spaced at a predetermined angle;

the drive pin is sleeved with the horizontal tube, the drive pin is provided with a radially-protruding sliding shaft passing through the elongated hole and the chute; and the drive member drives the sliding shaft to slide in the elongated hole and the chute when switching between the initial position and the braking position, so that the drive pin moves along an axis direction of the horizontal tube to allow the locking member to unlock or lock the wheel.

3. The wheel set brake mechanism according to claim 2, further comprising a first elastic member configured to act on the drive pin, so as to keep the drive member at the initial position through the drive pin.

4. The wheel set brake mechanism according to claim 3, wherein:

the sleeve portion is symmetrically provided with the chute and a further chute, and the horizontal tube is provided with the elongated hole and a further hole corresponding to the chute and the further chute, respectively;

the wheel set brake mechanism is provided with two brake assemblies, and the locking members of the two brake assemblies are configured to lock two wheels of the movable frame, wherein the sliding shaft of each of the two brake assemblies is sleeved with a corresponding set of the chute and the elongated hole; and the first elastic member is clamped between the drive pins of the two brake assemblies.

5. The wheel set brake mechanism according to claim 1, wherein the brake assembly further includes a first elastic reset member configured to act on the locking member, so as to keep the locking member at an unlocking position where the wheel is unlocked.

6. The wheel set brake mechanism according to claim 1, wherein:

the second end of the first cable has a connector, the connector being provided with a connecting groove; and the first end of the second cable is provided with a first pivot joint, the first pivot joint being rotatably arranged in the connecting groove.

7. The wheel set brake mechanism according to claim 1, wherein:

the movable frame is provided with a wheel seat, the wheel stand being pivotally connected to the wheel seat through the hollow shaft arranged vertically;

a sliding sleeve is fixed to the longitudinal shaft, the sliding sleeve slidably engages with the wheel stand, an axis of the sliding sleeve is perpendicular to a rolling the rolling axis of the wheel, and an end portion of the sliding sleeve away from the transverse shaft is provided with an accommodating groove; and the second end of the second cable is provided with a second pivot joint, the second pivot joint being rotatably arranged in the accommodating groove.

8. The wheel set brake mechanism according to claim 7, wherein a first elastic reset member is arranged between the wheel stand and the sliding sleeve.

9. The wheel set brake mechanism according to claim 7, wherein the longitudinal shaft extends into the sliding sleeve and is connected to the sliding sleeve through a pin shaft.

10. The wheel set brake mechanism according to claim 7, wherein a hub of the wheel is provided with a plurality of engagement holes along a circumferential direction, and the transverse shaft is capable of entering an engagement hole of the plurality of engagement holes to lock the wheel or exiting the engagement hole to unlock the wheel.

11. The wheel set brake mechanism according to claim 1, wherein:

the movable frame is provided with a wheel seat, and the wheel has a wheel stand, the wheel stand being pivotally connected to the wheel seat through the hollow shaft arranged vertically; and a hub of the wheel is provided with a plurality of engagement holes along a circumferential direction, and the transverse shaft is capable of entering an engagement hole of a plurality of the engagement holes to lock the wheel or exiting the engagement hole to unlock the wheel.

12. The wheel set brake mechanism according to claim 1, wherein:

the drive member includes a sleeve portion and a pedal portion extending from the sleeve portion, a horizontal tube of the movable frame being sleeved with the sleeve portion, and the drive member having an initial position and a braking position circumferentially spaced at a predetermined angle; and the wheel set brake mechanism further includes a locking assembly configured to lock the drive member at the braking position.

13. The wheel set brake mechanism according to claim 12, wherein:

the locking assembly includes a locking protrusion arranged outside the horizontal tube;

the sleeve portion is provided with an end surface abutting against the locking protrusion, and the end surface is provided with a locking recess; and when the locking protrusion engages with the locking recess, the drive member is locked at the braking position.

14. The wheel set brake mechanism according to claim 13, wherein the locking protrusion is formed by an elastically extensible locking pin, and an axis of the locking pin is parallel to an axis direction of the horizontal tube.

15. The wheel set brake mechanism according to claim 14, wherein an end portion of the horizontal tube is provided with a wheel seat, the wheel seat is provided with a mounting hole, a second elastic member and the locking pin are arranged in the mounting hole, and an end portion of the locking pin configured to engage with the locking recess is in a shape of a circular arc or truncated cone.

16. The wheel set brake mechanism according to claim 14, wherein the end surface is further provided with a guide groove slidably engaging with the locking protrusion.

17. A baby transport, comprising a movable frame and the wheel set brake mechanism according to claim 1, wherein the movable frame includes a front wheel and a rear wheel, the rear wheel is mounted on the movable frame through a hollow shaft in such a way the rear wheel is rotatable in all directions and the wheel set brake mechanism is configured to lock the rear wheel.

18. The baby transport according to claim 17, wherein:

the movable frame is provided with a wheel seat, the rear wheel has a wheel stand, and the wheel stand of the rear wheel is pivotally connected to the wheel seat, so as to allow the rear wheel to rotate in all directions; and the baby transport further includes a wheel set orienting mechanism, the wheel set orienting mechanism being configured to lock rotation of the wheel stand of the rear wheel.

19. The baby transport according to claim 18, wherein:

the wheel set orienting mechanism includes an operation portion, a third cable, a locating pin and a second elastic reset member, the operation portion is connected to a first end of the third cable, a second end of the third cable is connected to the locating pin, and an axis of the locating pin is parallel to a rotation axis of the wheel stand of the rear wheel; and the wheel stand of the rear wheel is provided with a locating hole, the second elastic reset member is configured to drive the locating pin to extend into the locating hole, and the operation portion is configured to move the locating pin out of the locating hole through the third cable.

20. The baby transport according to claim 18, wherein the movable frame includes a pair of front wheels and a pair of rear wheels, each of the front and rear wheels is mounted on the movable frame so as to rotate in all directions, and the wheel set orienting mechanism is configured to lock rotation of both wheel stands of the pair of rear wheels.

\*　　\*　　\*　　\*　　\*